United States Patent
Elis et al.

(10) Patent No.: US 10,906,675 B2
(45) Date of Patent: Feb. 2, 2021

(54) PACKAGING MACHINE WITH A WEIGHING DEVICE

(71) Applicant: Bizerba SE & Co. KG, Balingen (DE)

(72) Inventors: Eugen Elis, Rohrdorf (DE); Sascha Kirsch, Burladingen (DE)

(73) Assignee: BIZERBA SE & CO. KG, Balingen (DE)

( * ) Notice: Subject to any disclaimer, the term of this patent is extended or adjusted under 35 U.S.C. 154(b) by 0 days.

(21) Appl. No.: 16/537,657

(22) Filed: Aug. 12, 2019

(65) Prior Publication Data

US 2020/0047928 A1 Feb. 13, 2020

(30) Foreign Application Priority Data

Aug. 13, 2018 (EP) .................................. 18 188 721

(51) Int. Cl.
*B65B 11/48* (2006.01)
*B65B 5/04* (2006.01)
(Continued)

(52) U.S. Cl.
CPC ................ *B65B 11/48* (2013.01); *B65B 5/04* (2013.01); *B65B 41/12* (2013.01); *G01G 19/52* (2013.01)

(58) Field of Classification Search
CPC ......... B65B 11/00; B65B 11/02; B65B 11/48; B65B 11/54; B65B 49/00; B65B 49/08;
(Continued)

(56) References Cited

U.S. PATENT DOCUMENTS

| 4,578,926 A | * | 4/1986 | Sato | .......................... | B65C 9/02 |
| | | | | | 198/406 |
| 4,674,269 A | * | 6/1987 | Denda | ..................... | B65B 11/54 |
| | | | | | 53/228 |

(Continued)

FOREIGN PATENT DOCUMENTS

| DE | 202015104073 U1 | 10/2015 |
| EP | 0368496 A1 | 5/1990 |

(Continued)

OTHER PUBLICATIONS

Damping Capacity of Materials, by Redstone Arsenal, AL, published Oct. 20, 1966, retrieved from URL https://apps.dtic.mil/dtic/tr/fulltext/u2/640465.pdf on Sep. 16, 2020 (Year: 1966).*

(Continued)

*Primary Examiner* — Valentin Neacsu (74) *Attorney, Agent, or Firm* — Leydig, Voit & Mayer Ltd.

(57) ABSTRACT

A packaging machine for packaging articles with a stretchable film includes: a weighing device, which is rigidly fastened to a machine frame, for determining a weight of an article; a film transport device, which is fastened to the machine frame, with a belt conveyor for transporting the film to the article to be packaged; and a folding mechanism for folding the film. The folding mechanism having: two lateral slides that push the film left and right under the article to be packaged; and a rear slide which pushes the film from behind under the article to be packaged. The lateral slides and the rear slide are fastened to the machine frame via at least one damping element which is designed in such a way that it prevents or at least dampens transmission of mechanical vibrations of the lateral slides and of the rear slide to the machine frame.

17 Claims, 5 Drawing Sheets

(51) Int. Cl.
*B65B 41/12* (2006.01)
*G01G 19/52* (2006.01)

(58) Field of Classification Search
CPC . B65B 41/12; B65B 5/04; G01G 19/52; F16F 9/306; F16F 9/003; F16F 2224/0225; F16F 2224/0266; F16F 2224/025
USPC ......... 53/502, 441, 461, 465, 556, 203, 210, 53/218, 389.5; 181/207–209, 284, 290, 181/294
See application file for complete search history.

(56) References Cited

U.S. PATENT DOCUMENTS

| | | | | |
|---|---|---|---|---|
| 4,705,588 A * | 11/1987 | Treiber | ................... | B65C 1/023 |
| | | | | 156/360 |
| 4,709,531 A * | 12/1987 | Denda | ................... | B65C 9/06 |
| | | | | 198/456 |
| 4,813,211 A * | 3/1989 | Treiber | ................... | B65B 11/54 |
| | | | | 53/223 |
| 4,825,626 A * | 5/1989 | Treiber | ................... | B65B 11/54 |
| | | | | 53/131.2 |
| 4,951,447 A * | 8/1990 | Denda | ................... | B65B 11/54 |
| | | | | 53/131.2 |
| 5,157,903 A * | 10/1992 | Nakashima | ................... | B65B 11/54 |
| | | | | 493/476 |
| 5,215,382 A * | 6/1993 | Kemeny | ................... | E04H 9/022 |
| | | | | 14/73.5 |
| 6,082,698 A * | 7/2000 | Dubois | ................... | F16F 15/08 |
| | | | | 248/568 |
| 6,170,236 B1 * | 1/2001 | Whitby | ................... | B65B 11/54 |
| | | | | 53/441 |
| 6,189,302 B1 * | 2/2001 | Kudo | ................... | B65B 11/54 |
| | | | | 294/902 |
| 6,401,427 B1 * | 6/2002 | Snyder | ................... | E04H 9/10 |
| | | | | 109/49.5 |
| 2006/0272283 A1 * | 12/2006 | Kawanishi | ................... | B65B 57/14 |
| | | | | 53/51 |
| 2015/0225975 A1 * | 8/2015 | Sugita | ................... | E04H 9/028 |
| | | | | 52/167.1 |
| 2016/0039552 A1 * | 2/2016 | Koyama | ................... | B65B 11/54 |
| | | | | 53/556 |
| 2017/0190453 A1 * | 7/2017 | Heller | ................... | B65B 45/00 |
| 2018/0111349 A1 * | 4/2018 | Polidore | ................... | B32B 5/245 |
| 2018/0118395 A1 * | 5/2018 | Guzman | ................... | B65B 41/12 |

FOREIGN PATENT DOCUMENTS

| | | |
|---|---|---|
| EP | 3048052 A1 | 7/2016 |
| EP | 3093244 B1 | 3/2018 |
| WO | WO 0015499 A2 | 3/2000 |

OTHER PUBLICATIONS

Damping Properties of Materials, by Tom Irvine, published on Nov. 8, 2004, retrieved online from URL https://syont.files.wordpress.com/2007/05/damping-properties-of-materials.pdf on Sep. 16, 2020 (Year: 2004).*

A look at Belt, Chain, and Gear Drive Technology, published by Power Transmission Engineering on Nov. 28, 2017, retrieved from URL https://www.powertransmission.com/blog/a-look-at-belt-chain-and-gear-drive-technology/ on Sep. 18, 2020 (Year: 2017).*

PORON—cellular urethane foams Datasheets—by Rogers Corporation, Published 1998, retrieved from URL https://www.stockwell.com/data-sheets/poron-data-sheets.pdf on Sep. 18, 2020 (Year: 1998).*

* cited by examiner

PACKAGING MACHINE WITH A WEIGHING DEVICE

CROSS-REFERENCE TO RELATED APPLICATION

Priority is claimed to European Patent Application No. 18 188 721.7, filed on Aug. 13, 2018, the entire disclosure of which is hereby incorporated by reference herein.

FIELD

The invention relates to a packaging machine for packaging articles to be packaged by means of a stretchable film.

BACKGROUND

DE 20 2015 104 073 U1 discloses a packaging machine with a scale in an insertion mechanism. The scale weighs a tray with an article. The insertion mechanism subsequently moves the tray to a lifting mechanism. The packaging machine also has a film-feeding mechanism and a film-conveying mechanism by means of which a film is transported to a location above the lifting mechanism and is cut into a rectangular arch by a cutting mechanism. The lifting mechanism then pushes the tray with the article upwards against the film. The film is folded towards the underside of the tray by left, right, and rear folding plates or slides. A delivery pushing device pushes the tray to a delivery platform, wherein the front film section is folded towards the underside of the film by a front folding rod. The film is subsequently sealed by a heated roller on the way to the delivery platform.

A packaging machine with a film-feeding device and a lifting table for transporting an article to be packaged against a film and with a folding and sealing mechanism is disclosed in EP 3 093 244 B1.

The rapid movement of the folding plates during folding of the film results—in particular, at high packaging speeds—in vibrations that are transmitted to the machine frame. As a result of these vibrations, exact weighing is made considerably more difficult, and the weighing values of the tray and the article can be falsified. In this case, it must be taken into account that the packages are sold according to price/weight, and the quality of the weighing must meet special calibration requirements.

SUMMARY

An embodiment of the present invention provides a packaging machine for packaging articles with a stretchable film that includes: a weighing device, which is rigidly fastened to a machine frame, for determining a respective weight of a single article to be packaged; a film transport device, which is fastened to the machine frame, with a belt conveyor for transporting the film to the article to be packaged; and a folding mechanism for folding the film. The folding mechanism having: two lateral slides that push the film left and right under the article to be packaged; and a rear slide which pushes the film from behind under the article to be packaged. The lateral slides and the rear slide are fastened to the machine frame via at least one damping element which is designed in such a way that it prevents or at least dampens transmission of mechanical vibrations of the lateral slides and of the rear slide to the machine frame.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a packaging machine in which the weighing value is not falsified, or is falsified only within a reasonable tolerance range, even at high packaging speeds.

Embodiments provide an improved packaging machine in a technically particularly simple and surprisingly effective manner, where both the lateral slides and the rear slide are fastened to the machine frame via at least one damping element. The damping element is designed in such a way that it prevents or at least dampens transmission of mechanical vibrations of the lateral slides and of the rear slide to the machine frame.

A high-performance, stretch film packaging machine can package more than 35 articles to be packaged—in particular, large trays—per minute. Very powerful machines can also reach more than 40 in the case of small trays, and even up to 50 packages per minute, depending upon the package size.

In order to package an article to be packaged, in an embodiment, the following steps are, in particular, be carried out: the article to be packaged is received and weighed; the film is unwound from the film supply, cut off, and tensioned with the belt conveyors; the article to be packaged is lifted by a lifting table and pressed upwards below the film; by means of the lateral slides, the film is simultaneously pushed left and right under the article to be packaged; furthermore, the film is pushed from behind under the article to be packaged by means of the rear slide; the article to be packaged is labeled and pushed onto the sealing tape, wherein the front film part is pushed under the package; and the film is sealed under the tray, and the article to be packaged is delivered.

While some of the steps can be performed in parallel (e.g., while the previous package is being delivered, the next package may already be pushed under the film by means of the lifting table), some of the steps can only be performed successively. For example, the lateral slides must again be in their starting position so that the rear slide can push the film under the package from behind, in order to avoid a collision of the lateral slides and the rear slide.

If 40 packages per minute or more are to be packaged, there is not even a second for the back-and-forth movement of the lateral slides. With a width of an article to be packaged, e.g., a tray, of 20 cm, each lateral slide must move more than 10 cm under the package within this time and must travel the same distance back. The lateral slide thus moves at a high speed and with high acceleration.

In such a packaging process, the acceleration of the lateral slides and of the rear slide produces a considerable momentum, which affects the packaging machine. Forces also arise when the lateral slides meet the film stretched by belt conveyors in order to push said film under the article to be packaged. At the moment the lateral slides push the film under the article to be packaged, the belt conveyors are opened so that the film is "released" and can be carried along under the article to be packaged by the slides. In the process, strong forces act on the slides. Further forces arise, inter alia, at the slides during the movement under the article to be packaged, due to friction. During a packaging process, various overlapping, partially relatively high, forces thus act on the slides.

As a result of the (movable) fastening of the slides to the machine frame, vibrations then arise in the packaging machine, which vibrations make the process of weighing difficult and can falsify the measurement result of the weighing process, which, however, must satisfy special calibration requirements as mentioned above. The transmission of the vibrations from the slides to the machine frame, and thus to the scale or the weighing element, is prevented or damped—in particular, by at least a 50% reduction of a vibration amount at the slides to a vibration amount transmitted to the machine frame—by damping elements (vibration dampers) according to the invention, via which the rear slide and the lateral slides are fastened to the machine frame—in practice, preferably by six such damping elements. Exact weighing of the article to be packaged is thereby rendered more precise, or reasonably made possible in the first place.

The damping elements, moreover, absorb shear and compressive forces which arise as a result of the movement of the slides. This avoids a vibration-transmitting, rigid connection between the packaging module and the machine frame.

An advantageous embodiment of the packaging machine according to the invention is characterized in that the two lateral slides form a common, mechanically connected unit and are driven by means of a common—preferably electric—motor in simultaneous, opposite-synchronous motion by means of a rotating drive belt. In this way, the packaging machine according to the invention can be made particularly compact in the region of the lateral slides.

Opposite-synchronous movement of the lateral slides is to be understood at this point to mean, in particular, that the two slides move synchronously towards one another or away from one another. For this purpose, one lateral slide is preferably arranged on the upper strand of the drive belt, and one lateral slide is preferably arranged on the lower strand of the drive belt, wherein the lateral slides run parallel to one another.

A further embodiment is characterized in that the two lateral slides and the rear slide are arranged together in a packaging module, and that the packaging module is fastened to the machine frame via the at least one damping element. Damping the packaging module with the lateral slides and the rear slide by means of at least one damping element—in practice, in particular, six damping elements—can simultaneously bring about the damping of the vibrations of all three slides.

In a class of further advantageous embodiments of the invention, the damping element comprises a first plate—preferably made of metal—with which the damping element is fastened to the machine frame. The damping element further comprises a second plate—preferably likewise made of metal—with which the damping element is connected, directly or indirectly—optionally, movably—to the lateral slides or to the rear slide or to the packaging module. The two plates do not touch each other. Rubbery-elastic damping material—in particular, a plastic compound, and preferably a PU foam—is arranged between the two plates. The plates provide the damping element(s) with particularly high stability and protect the rubbery-elastic material.

The rubbery-elastic material brings about the actual damping. The rubbery-elastic material may also have a structured framework—in particular, a honeycomb structure or honeycomb-like structure. Different structures of the material are suitable for different types of acting forces—in particular, shear forces. Since, as a result of the packaging module, shear forces, in particular, act on its fastening on the frame, a damping element according to the invention is particularly suitable for absorbing these forces. However, the damping element can also be designed as a foam-filled stamped part.

In particularly preferred developments of this class of embodiments, the two plates are separated by between 3 mm and 8 mm—preferably between 4 mm and 6 mm—which is bridged by the damping material. With such a distance, sufficient damping material can be introduced into the gap in order to bring about sufficient damping.

A further advantageous embodiment of the film transport device is characterized in that the rubbery-elastic damping material has a modulus of elasticity E in the range of $5 \cdot 10^6$ $N/m^2 \leq E \leq 5 \cdot 10^8$ $N/m^2$, and preferably $1 \cdot 10^7$ $N/m^2 \leq E \leq 1 \cdot 10^8$ $N/m^2$. With values of the modulus of elasticity in this range, sufficient damping of the vibrations is ensured.

In a further class of developments of the above embodiments, the plates of the damping element are fastened both to the machine frame and, directly or indirectly—optionally, movably—to the lateral slides or to the rear slide or to the packaging module via a reversible fastening means —preferably by means of screws. Screws or other fastening means, such as clamps, bring about a stable, reversible connection of the damping elements to the machine frame, on the one hand, and the slides, on the other. Non-destructive disassembly is possible at any time—for example, for repair purposes.

A preferred variant of this class of developments is characterized in that the fastening means—preferably screws—are designed and positioned in such a way that, in addition to the respective plate, they still touch either only the machine frame or only, directly or indirectly—optionally, movably—the lateral slides or only, directly or indirectly—optionally, movably—the rear slide or only the packaging module. This prevents the screws themselves from forming a vibration-undamped mechanical connection between the machine frame and the slides.

A further embodiment of the invention provides that the reversible fastening means comprise screws each having a screw head, and that an annular gap having a gap width between 0.5 mm and 1.5 mm remain between the second plate, facing away from the machine frame, and a screw head. Transmission of the vibrations is reliably prevented by this annular gap.

A preferred variant of this embodiment is characterized in that at least a portion of the screws engages with their threads in a corresponding mating thread in the machine frame. In this case, the screw head of the respective screw rests on the first plate on the machine frame side in the screwed-in state. It is further provided that the screw head be countersunk in a bore through the second plate facing away from the machine frame and through the rubbery-elastic damping material, the diameter of which bore is between 1 mm and 3 mm larger than the diameter of the screw head. In this arrangement of the screws on the first plate and in the second plate, the damping elements are connected to the machine frame in a stable and simple manner.

In another development of this embodiment, at least a portion of the screws is arranged with their screw heads at a distance from the machine frame. The screw head therefore does not rest on the machine frame. The screw head is countersunk in a first bore through the first plate on the machine frame side and through the rubbery-elastic damping material. Furthermore, the thread of these screws engages through a second bore through the second plate facing away from the machine frame and through a guide of the packaging module. The thread is screwed to the bracket of the packaging module by means of a nut. This arrangement of the screws with a passage through the second plate and fixing by nuts allows a stable connection of the damping elements to the packaging module.

A further improvement of this development can be achieved in that at least a portion of the screws is secured against rotation by means of a bolt made of rubbery-elastic damping material, which bolt is fastened in the machine frame and engages in the screw head in the screwed-in state. The anti-rotation device here forms a further safety element in order to prevent loosening of the screws and rotation of the damping element about the axis of the first screw.

A further embodiment of the packaging machine according to the invention provides a pushing slide which pushes the article to be packaged onto a heat sealing tape after the actions of the two lateral slides and of the rear slide are completed. In the process, the film is also pushed from the front under the article to be packaged. The pushing slide is either integrated into the packaging module or fastened to the machine frame via at least one separate damping element. The pushing slide allows rapid further transport of the article to be packaged to the heat sealing tape. A damping element can suppress or at least considerably dampen transmission of the vibrations arising during this further transport to the machine frame.

A preferred embodiment of the packaging machine is characterized in that at least the parts of the film transport device which comprise the belt conveyor for transporting the film are fastened to the machine frame via at least one separate damping element. Vibrations also occur during the transport of the film by the belt conveyor, which vibrations can be suppressed or reduced to a controlled magnitude by a damping element.

Lastly, a further embodiment of the packaging machine is characterized in that it provides a stretch module for tensioning the film before its contact with the article to be packaged, which stretch module is, in particular, fastened to the machine frame via at least one separate damping element. As a result of pre-stretching in a stretch module, the film lies particularly smoothly around the article to be packaged. The stretch module comprises, in particular, the belt conveyors. The vibrations associated with stretching can also be damped on the machine frame by a damping element.

Further features and advantages of the invention arise from the claims and from the following detailed description of an exemplary embodiment of the invention with reference to the figures in the drawings, which show details of embodiment of the invention. The individual features can be implemented individually or combined in any combination in variants of the invention.

Figure 1:
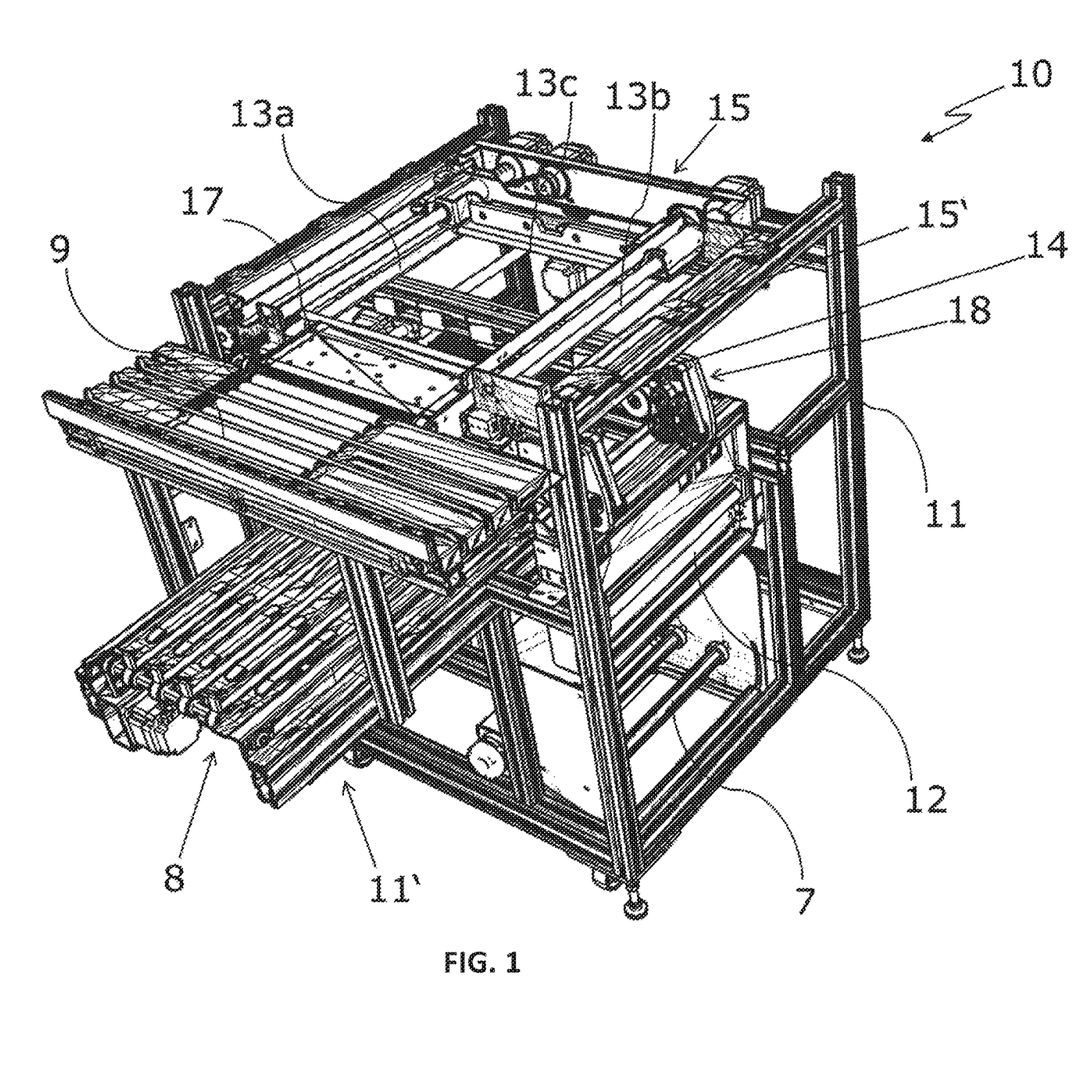
FIG. 1 is an isometric view of a packaging machine for packaging articles to be packaged by means of a stretchable film.

FIG. 1 shows an isometric view of a packaging machine 10 for packaging articles to be packaged by means of a stretchable film. The machine has a machine frame 11. A weighing device 11' is rigidly fastened to the machine frame 11. The weighing device 11' serves for determining the respective weight of a single article to be packaged. A film transport device 12 for feeding films from a film supply 7 is also provided on the machine frame and has a stretching module or stretch module 18 for pre-tensioning the films prior to introduction into a folding mechanism for folding the film around the article to be packaged. The folding mechanism comprises two lateral slides 13a, 13b, which push the film left and right under the article to be packaged. The folding mechanism furthermore comprises a rear slide 13c, which pushes the film from behind under the article to be packaged.

According to the invention, the lateral slide 13a, 13b and the rear slide 13c are arranged compactly in a packaging module 15 of the folding mechanism.

Figure 2:
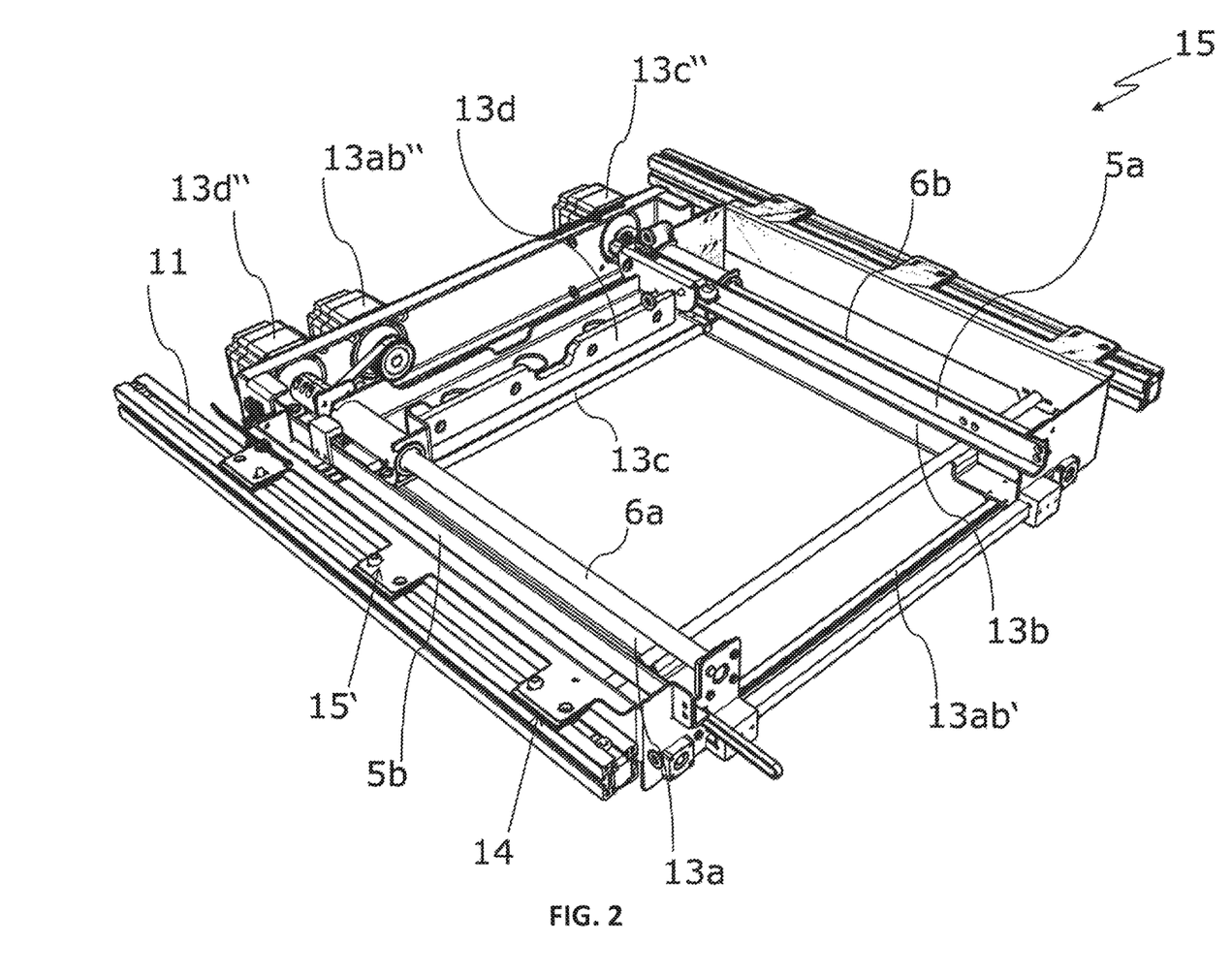
FIG. 2 is an isometric view of the packaging module of the packaging machine, with the drive motors for the slides.

According to the invention, the packaging module 15 is fastened to the machine frame 11 via six brackets, one of which is denoted here, by way of example, by 15', and six damping elements, one of which is denoted here, by way of example, by 14 (see also FIG. 2). The six damping elements 14 are designed in such a way that they prevent or at least dampen transmission of mechanical vibrations of the lateral slides 13a, 13b and of the rear slide 13c.

The packaging machine 10 has a sealing tape 17 for heat-sealing the film packaging around the article to be packaged. Moreover, the packaging machine 10 has an entrance 8 for introducing the article to be packaged into the packaging machine 10 and a discharge belt 9 for transporting away the article to be packaged after heat-sealing the article to be packaged.

FIG. 2 shows an isometric view of the packaging module 15. The lateral slides 13a, 13b are arranged on a drive belt 13ab'. The packaging module 15 has a pushing slide 13d for transporting the article to be packaged onto the heat-sealing tape 17 (see FIG. 1). The pushing slide 13d is driven by a motor 13d". Moreover, the packaging module has the rear slide 13c for folding the film around the article to be packaged, together with the lateral slides 13a, 13b. The lateral slides 13a, 13b are driven as a mechanically connected unit by means of a common—preferably electric—motor 13ab" in simultaneous, synchronous, oppositely-directed motion. The rear slide 13c is driven by a motor 13c". The pushing slide 13d is guided and driven by a guide 5a and a threaded rod 6a. The rear slide 13c is likewise guided and driven by a guide 5b and a threaded rod 6b. The packaging module 15 is fastened to the machine frame 11 by means of the brackets, one of which is denoted here, by way of example, by 15', and the damping elements, one of which is denoted here, by way of example, by 14.

Figure 3:
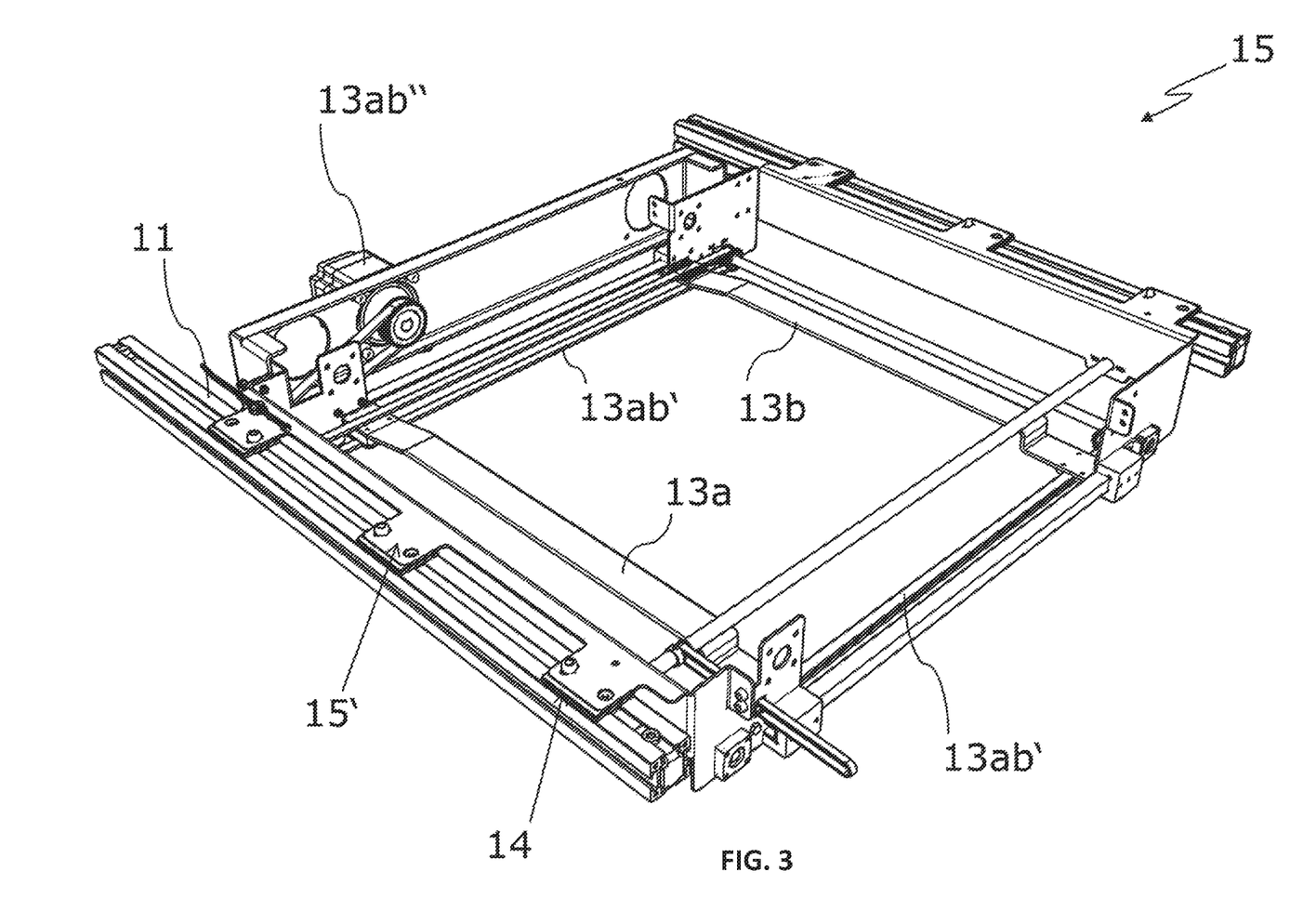
FIG. 3 is, as in FIG. 2, but without the associated rear slide and without the pushing slide and their drive motors.

FIG. 3 shows an isometric view of the packaging module 15 without the rear slide 13c and without the pushing slide 13d, as well as the associated threaded rods and guides (see FIG. 2). As a result, the lateral slides 13a, 13b can be shown more clearly. In particular, the lateral slides 13a, 13b are arranged at an upper and a lower strand of drive belt 13ab'. Also shown is the drive motor 13ab" for the lateral slides 13a, 13b. Also shown are the brackets, one of which is denoted here, by way of example, by 15', and the damping elements, one of which is denoted here, by way of example, by 14, with which the packaging module 15 is fastened to the machine frame 11.

Figure 4:
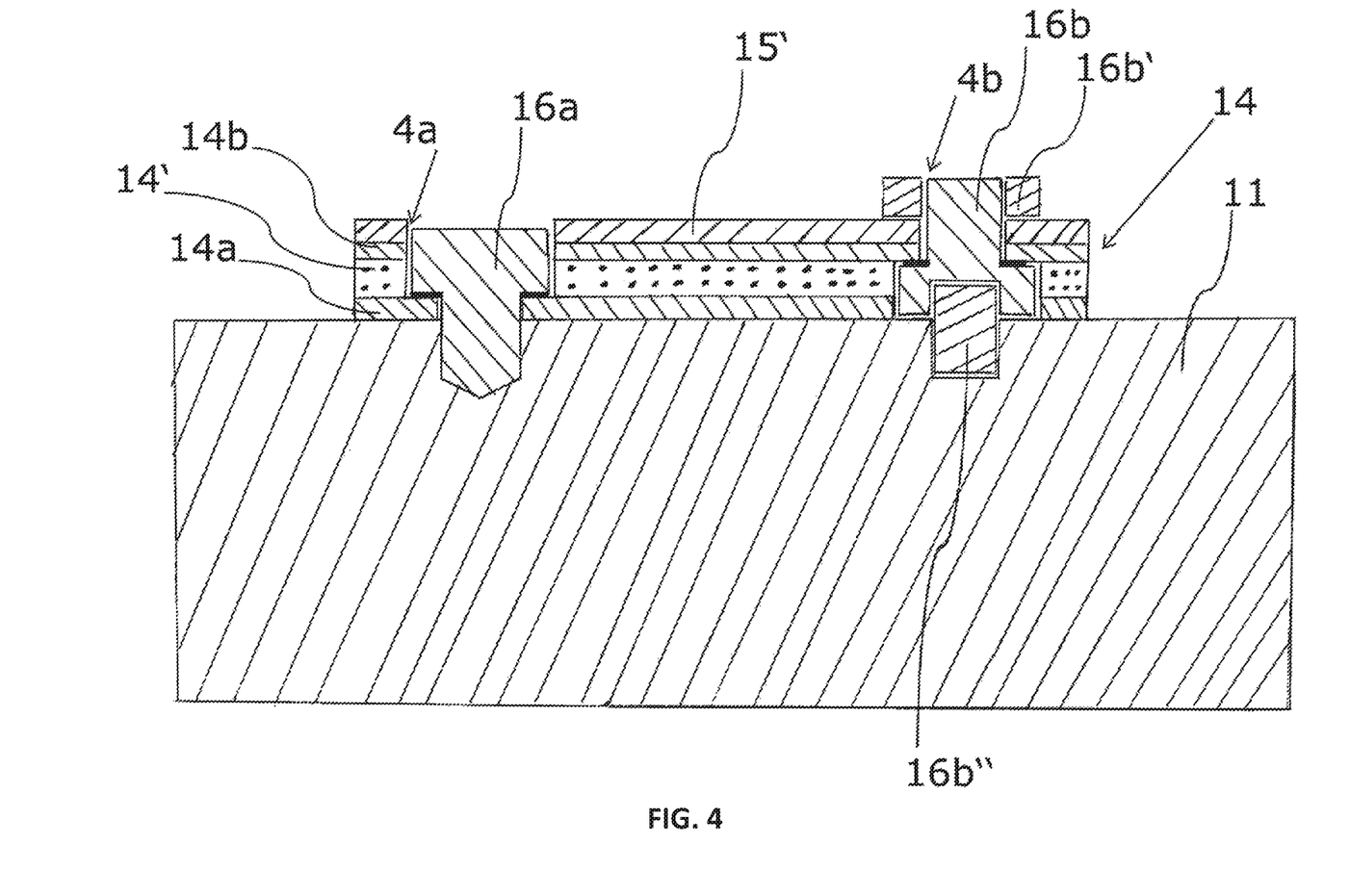
FIG. 4 is a schematic cross-section through the bracket of the packaging module, and a damping element fastened to the machine frame of the packaging machine.

FIG. 4 shows a schematic cross-section of a damping element 14 which, together with the bracket 15' of the packaging module 15 (see FIG. 2), is fastened to the machine frame 11. The damping element 14 comprises a first plate 14*a* made of metal and arranged on the machine frame 11. The damping element 14 also has a second plate 14*b* facing away from the machine frame 11. A rubbery-elastic damping material 14' is arranged between the plates 14*a*, 14*b*.

A screw 16*a* engages in a corresponding mating thread (not shown) in the machine frame 11, wherein the screw head of the screw 16*a* rests on the first plate 14*a*. The screw head of the screw 16*a* is countersunk in a bore through the second plate 14*b* and the rubbery-elastic damping material 14'. An annular gap 4*a* is formed between the screw head of the screw 16*a* and the second plate 14*b*, as well as the damping material.

A further screw 16*b* is countersunk with its screw head through the first plate 14*a* and the rubbery-elastic damping material 14'. The thread (not shown) of the further screw 16*b* engages through a bore through the second plate (14*b*) and through a guide (not shown) of the packaging module 15 (see FIG. 2). The further screw 16*b* is screwed to the bracket 15' of the packaging module 15 by means of a nut 16*b*'. Between the further screw 16*b* and the plates 14*a*, 14*b* and the damping material 14', there is an annular gap 4*b* in the circumferential direction of the further screw 16*b*. A bolt 16*b*" of rubbery-elastic material engages in the screw head of the further screw 16*b* and secures the further screw 16*b* against rotation.

Figure 5:
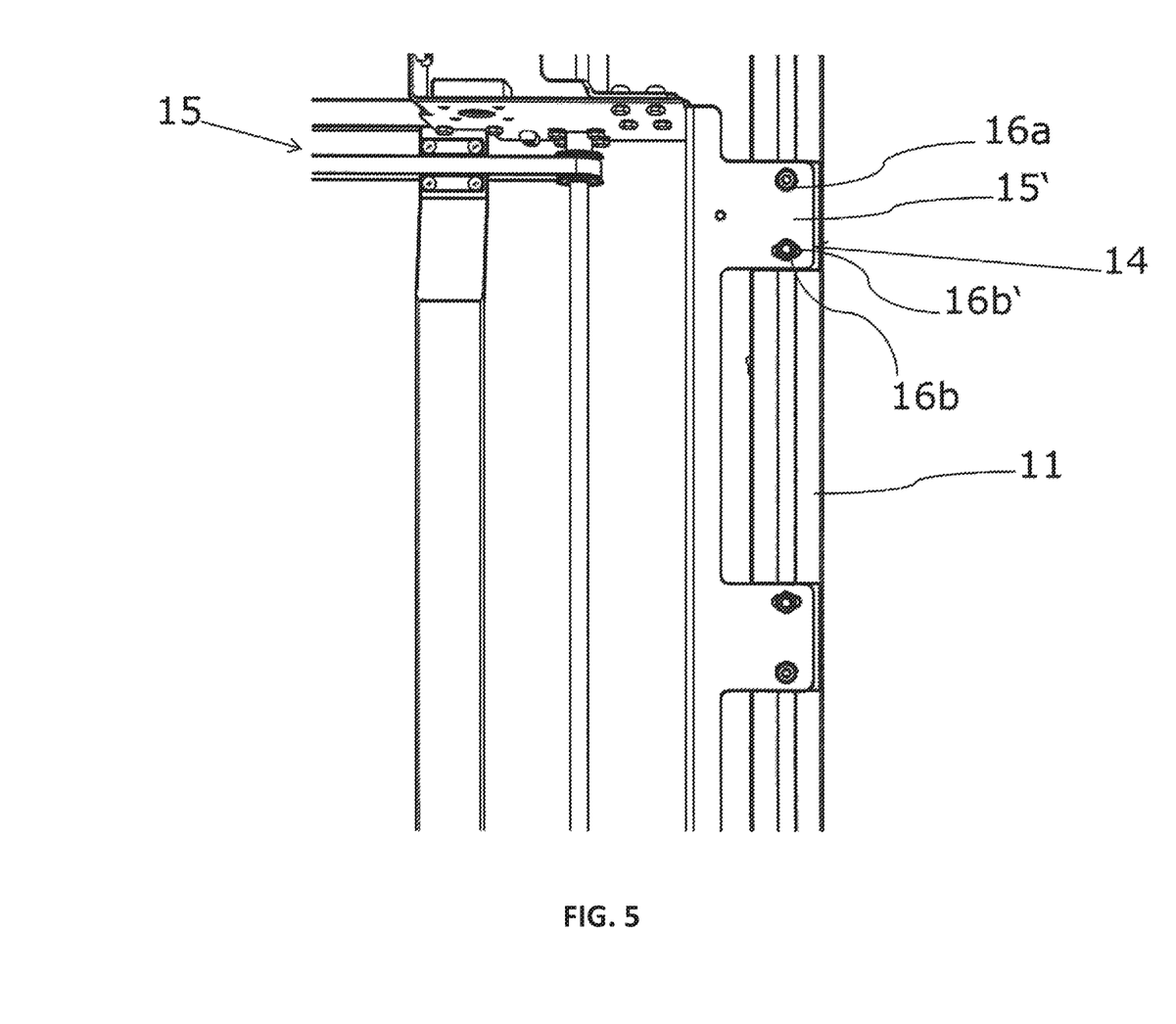
FIG. 5 is a detailed view of the fastening of the packaging module to the machine frame.

FIG. 5 shows a detailed view of the fastening of the packaging module 15 to the machine frame 11 via the damping elements 14. The screw 16*a*, whose screw head is countersunk in a bore through the second plate 14*b* and engages in the machine frame 11, is shown. The further screw 16*b*, whose screw head is countersunk in a bore through the first plate 14*a* and which is screwed to the bracket 15' of the packaging module by means of a nut 16*b*', is also shown. The bolt 16" forms a further safety element here. Thus, loosening of the screws is avoided, on the one hand, and rotating the first plate 14*a* around the screw 16*a* is prevented, on the other. In this way, the plate 14*a* cannot move relative to the machine frame 11, and rotation of the damping element relative to the machine frame 11 is thus also reliably prevented.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What follows is a list of reference signs used herein:

4*a, b* Gaps
5*a, b* Guides
6*a, b* Threaded rods
7 Film supply
8 Entrance
9 Discharge belt
10 Packaging machine
11 Machine frame
11' Scale/Weighing device
12 Film transport device
13*a, b* Lateral slides
13*c* Rear slide
13*d* Pushing slide
13*ab*' Drive belt
13*ab*" Motor
14 Damping element
14*a, b* Plates
14' Damping material
15 Packaging module
15' Bracket
16*a, b* Screws
17 Sealing tape
18 Stretch module

The invention claimed is:

1. A packaging machine for packaging articles with a stretchable film, the packaging machine comprising:
   a weighing device, which is rigidly fastened to a machine frame, for determining a respective weight of a single article to be packaged;
   a film transport device, which is fastened to the machine frame, with a belt conveyor for transporting the film to the article to be packaged; and
   a folding mechanism for folding the film, the folding mechanism comprising:
      two lateral slides that push the film left and right under the article to be packaged; and
      a rear slide which pushes the film from behind under the article to be packaged,
   wherein both the lateral slides and the rear slide are fastened to the machine frame via at least one vibration damper which is configured to prevent or at least dampen transmission of mechanical vibrations of the lateral slides and of the rear slide to the machine frame,
   wherein the at least one vibration damper comprises a first plate with which the vibration damper is fastened to the machine frame, and a second plate with which the vibration damper is connected, directly or indirectly to the lateral slides or to the rear slide or to a packaging module, wherein the first plate and the second plate do not touch each other, and wherein a rubbery-elastic material is arranged between the first plate and the second plate,
   wherein the first plate and the second plate of the at least one vibration damper are fastened both to the machine frame and, directly or indirectly, to the lateral slides or to the rear slide or to the packaging module via a reversible fastener,
   wherein the reversible fastener comprises screws each having a screw head, and wherein an annular gap remains between the second plate, facing away from the machine frame, and the respective screw head.

2. The packaging machine according to claim 1, wherein the two lateral slides form a common, mechanically connected unit and are driven via a rotating drive belt by a common motor in simultaneous, opposite-synchronous motion.

3. The packaging machine according to claim 1, wherein the two lateral slides and the rear slide are arranged together in the packaging module and the packaging module is fastened to the machine frame via the at least one vibration damper.

4. The packaging machine according to claim 1, wherein the first plate and the second plate are separated by between 3 mm and 8 mm, which is bridged by the rubbery-elastic material.

5. The packaging machine according to claim 1, wherein the rubbery-elastic material has a modulus of elasticity E in a range $5 \cdot 10^6$ N/m$^2 \leq E \leq 5 \cdot 10^8$ N/m$^2$.

6. The packaging machine according to claim 4, wherein the two plates are separated by between 4 mm and 6 mm.

7. The packaging machine according to claim 5, wherein the modulus of elasticity E is in the range of $1 \cdot 10^7$ N/m$^2 \leq E \leq 1 \cdot 10^8$ N/m$^2$.

8. The packaging machine according to claim 1, wherein the fastener is designed and positioned in such a way that it touches:
   a) only one of the first plate and the second plate, and
   b) only one of the group formed by the machine frame, the lateral slides, the rear slide, and the packaging module.

9. The packaging machine according to claim 1, wherein the annular gap has a gap width between 0.5 mm and 1.5 mm between the second plate, facing away from the machine frame, and the respective screw head.

10. The packaging machine according to claim 9, wherein at least a portion of at least one of the screws engages with corresponding threads in a corresponding mating thread in the machine frame, wherein the screw head of the at least one of the screws rests on the first plate on a machine frame side in a screwed-in state, and wherein the screw head of the at least one of the screws is countersunk in a bore through the second plate facing away from the machine frame and through the rubbery-elastic material, wherein a diameter of the bore is between 1 mm and 3 mm larger than a diameter of the screw head of the at least one of the screws that is countersunk.

11. The packaging machine according to claim 9, wherein at least a portion of at least one of the screws is arranged with the respective screw head at a distance from the machine frame, wherein the respective screw head is countersunk in a first bore through the first plate on a machine frame side and through the rubbery-elastic material, and wherein a thread of the at least one of the screws engages through a second bore through the second plate facing away from the machine frame and through a guide of the packaging module, and is screwed to a bracket of the packaging module by a nut.

12. The packaging machine according to claim 11, wherein at least a portion of the screws is secured against rotation by a bolt made of rubbery-elastic material, which bolt is fastened in the machine frame and engages in the screw head in a screwed-in state.

13. The packaging machine according to claim 1, wherein a pushing slide is provided which is configured to: push the article to be packaged onto a heat sealing tape after actions of the two lateral slides and of the rear slide are completed, and to push the film from infront under the article to be packaged, and wherein the pushing slide is either integrated into the packaging module or fastened to the machine frame via at least one separate vibration damper.

14. The packaging machine according to claim 1, wherein at least parts of the film transport device which comprise the belt conveyor for transporting the film are fastened to the machine frame via at least one separate vibration damper.

15. The packaging machine according to claim 1, wherein a stretch module for tensioning the film before contact of the film with the article to be packaged is provided, wherein the stretch module is fastened to the machine frame via at least one separate vibration damper.

16. The packaging machine according to claim 1, wherein the first plate is made of metal, the second plate is made of metal, the at least one vibration damper is movably connected, directly or indirectly, to the lateral slides or to the rear slide or to the packaging module, and the rubbery-elastic material is a PU foam.

17. The packaging machine according to claim 1, wherein the plates of the at least one vibration damper are movably fastened to the lateral slides or to the rear slide or to the packaging module via screws.

* * * * *